United States Patent Office 3,185,397
Patented May 25, 1965

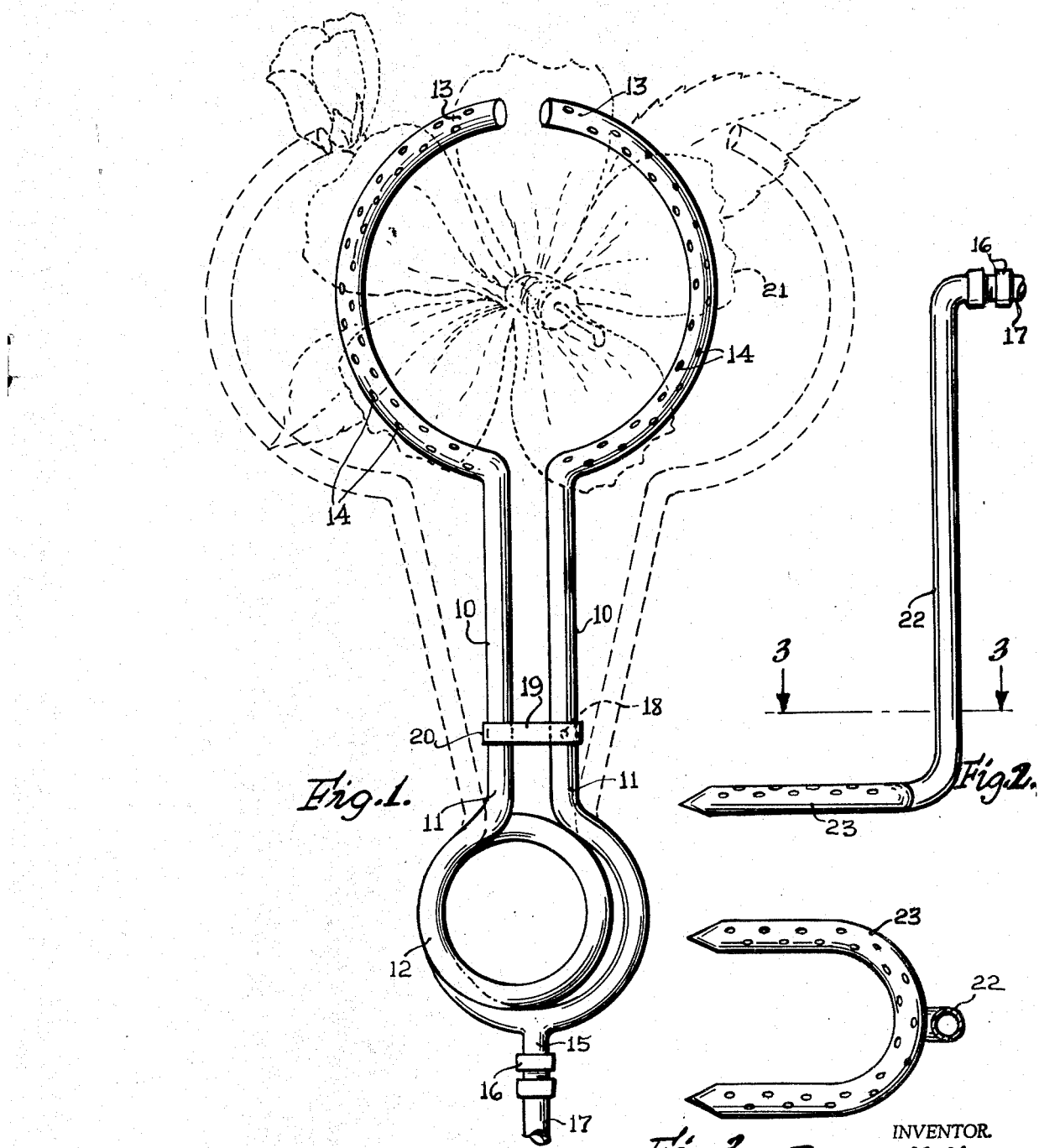

3,185,397
LEAF SPRAYERS
Permil N. Nelson, Galesburg, Ill., assignor to Lynn H. Ewing, doing business as Blackhawk Company, Rock Island, Ill.
Filed Apr. 22, 1963, Ser. No. 274,724
1 Claim. (Cl. 239—556)

My invention relates to certain new and useful improvements in leaf sprayers especially adapted for washing the underside of a leaf of plants, shrubbery, or trees, to remove therefrom insects, mites, worms and the like, as well as insect eggs and larvae.

An object of the invention is to provide a device for the above-stated purpose which is easily maneuverable and which will be efficient for the intended purpose.

Other objects will appear hereinafter.

The invention consists in the novel combination and arrangement of parts to be hereinafter described and claimed.

The invention will be best understood by reference to the accompanying drawings showing the preferred form of construction, and in which:

FIG. 1 is a plan view of one form of the invention;

FIG. 2 is a side elevational view of a modified form of construction;

FIG. 3 is a sectional detail view taken substantially on line 3—3 of FIG. 2.

The several objects of the invention are preferably accomplished by the preferred form of construction shown in the accompanying drawings. In this connection my improved leaf sprayer includes a pair of elongated tubular arms 10. Corresponding end portions 11 of these arms are connected together by a spring coil 12 which normally serves to maintain the arms 10 in spaced relation with respect to each other, as shown in dotted lines in FIG. 1. The opposite end portions of the arms 10 are curved in opposite directions in the form of a semicircle in plan view, as indicated at 13. These curved portions 13 of the arms 10 are perforated as at 14. The spring coil 12 has connection with a nipple 15 which, by a coupling 16, is connected to a supply conduit or hose 17.

To complete the invention shown in FIG. 1, I secure to one of the arms 10 as at 18 a spring clip 19 which has a hooked end portion 20 adapted to hook over the opposite arm 10. When in this position, the clip 19 serves to hold the arms 10 in close position with respect to each other for reasons which will be hereinafter apparent. The hose 17 may be connected to a water line (not shown) or to a pressure tank which contains insecticide. There may be incorparted in the conduit or hose 17 the conventional thumb-button-operated valve to control passage of the water or insecticide, as the case may be, through the sprayer.

In use, the clip 19 is disengaged from one of the arms 10 to permit the arms and their semicircular portions to spread apart in the manner shown in FIG. 1. When the device is placed beneath a leaf, the arms 10 are pressed toward each other and the clip 19 positioned to reengage the arm 10 to hold the arm in compressed condition as shown in full lines in FIG. 1. The valve (not shown) is then opened to permit the water or insecticide, as the case may be, to flow through the perforations 14 against the underside of the leaf 21. The pressure of the water or other fluid is such as will thoroughly drench the underside of the leaf to wash therefrom any insects, eggs, or larvae.

In the case of a long-stem plant such as a rose bush or the like, the sprayer may be positioned at the lower end or base of the stem, with the arms 10 latched together in close relation with respect to each other. When the fluid is flowing through the perforations, the operator then may move the sprayer up in a longitudinal direction with respect to the stem. In this movement, the fluid is sprayed on the underside of the leaves as the sprayer is moved upwardly along the stem, thus drenching and washing the underside of the leaf for the purposes hereinbefore stated. This form of invention may also be used in washing the leaves of house plants, both natural and artificial for the purpose of removing dust and other foreign matter from the leaves.

The sprayer as described may also be used with great effectiveness to wash red spiders and other insects from evergreens in the same manner as employed to wash the leaves of a long-stem plant.

In the form shown in FIGS. 2 and 3, the tubular member 22 at its lower end portion terminates into a perforated U-shaped base 23. The upper end portion of the tubular member 22 is connected to the conduit or hose line 17 by the coupling 16. This form of construction is especially useful where it is required to wash the undersurface of leaves of low-growing plants, shrubs and the like. When so used, the tubular member 22 serves as a handle, facilitating maneuvering the sprayer about.

It is intended that the sprayer be formed of such material as will best serve the purpose, and such material may be conventional plastic, copper, brass, or the like.

While I have illustrated and described the preferred form of construction for carrying my invention into effect, this is capable of variation and modification without departing from the spirit of the invention. I therefore do not wish to be limited to the precise details of construction set forth, but desire to avail myself of such variations and modifications as come within the scope of the appended claim.

Having thus described my invention, what I claim as new and desire to protect by Letters Patent is:

A leaf sprayer for washing the under surface of a leaf of a plant to remove insects therefrom comprising
(a) an elongated conduit pipe bent substantially U-shaped to provide a bight portion and opposite elongated arms extending in the same general direction with respect to each other from said bight portion and having their end portions curved in opposed directions to provide opposite semi-circular perforated end portions,
(b) a conduit coil formed in one of said arms adjacent said bight portion for yieldably holding said curved end portions in spaced relation with respect to each other while permitting said arms to be manually pressed toward each other to dispose the curved end portions of the arms in position to encircle the stem of the plant beneath a leaf to be sprayed,
(c) and a nipple at said bight portion for connection to a liquid supply line.

References Cited by the Examiner
FOREIGN PATENTS

| 319,459 | 7/02 | France. |
| 412,986 | 5/10 | France. |
| 1,212,964 | 10/59 | France. |
| 837,189 | 4/52 | Germany. |
| 4,767 | 1897 | Great Britain. |
| 307,176 | 4/33 | Italy. |

ANTONIO F. GUIDA, *Acting Primary Examiner.*

T. GRAHAM CRAVER, *Examiner.*